(12) United States Patent
Siekmann et al.

(10) Patent No.: US 7,704,381 B2
(45) Date of Patent: Apr. 27, 2010

(54) BIOMASS THERMAL OILING

(75) Inventors: Eckhardt Siekmann, Bünde (DE);
Hermann Meyer, Kirchlengern (DE)

(73) Assignee: Proton Technology GmbH i.G.,
Kirchlengern (DE)

( * ) Notice: Subject to any disclaimer, the term of this patent is extended or adjusted under 35 U.S.C. 154(b) by 326 days.

(21) Appl. No.: 11/573,248

(22) PCT Filed: Aug. 5, 2005

(86) PCT No.: PCT/EP2005/008477

§ 371 (c)(1),
(2), (4) Date: May 2, 2007

(87) PCT Pub. No.: WO2006/015804

PCT Pub. Date: Feb. 16, 2006

(65) Prior Publication Data

US 2007/0261996 A1    Nov. 15, 2007

(30) Foreign Application Priority Data

Aug. 5, 2004    (DE) ................. 10 2004 038 220

(51) Int. Cl.
*C10G 21/00* (2006.01)
*C10G 1/02* (2006.01)
*C10G 1/00* (2006.01)
*C07C 1/00* (2006.01)

(52) U.S. Cl. .................. 208/318; 208/400; 585/240; 585/242; 423/DIG. 18

(58) Field of Classification Search ............. 585/240, 585/242; 208/400, 318; 423/DIG. 18
See application file for complete search history.

(56) References Cited

U.S. PATENT DOCUMENTS 2,100,354 A * 11/1937 Pier et al. .................. 208/419

(Continued)

FOREIGN PATENT DOCUMENTS

DE          3877355 T2       7/1993

(Continued)

OTHER PUBLICATIONS

Machine translation of DE4421448 A1—Mar. 18, 2009.*

(Continued)

*Primary Examiner*—Walter D Griffin
*Assistant Examiner*—Huy-Tram Nguyen
(74) *Attorney, Agent, or Firm*—Smith Moore Leatherwood LLP

(57) ABSTRACT

A process for the production of hydrocarbon-containing oils, in which a starting material containing a sugar and/or a sugar derivative is thermally cleaved, including a reaction step in which the starting material is brought into contact with a contact oil which has an initial boiling point of at least about 200° C. at a pressure of about 1013 mbar with formation of a reaction phase at a reaction temperature in the range of from about 200 to about 600° C. and a pressure in the range of from about 0.1 to about 50 bar. The process also includes a processing step in which the reaction phase is separated into a low-boiling fraction and a high-boiling fraction. At least a portion of the high-boiling fraction is recirculated into the reaction step as contact oil. The invention also relates to a system for this process which is equipped with an oilification module.

38 Claims, 8 Drawing Sheets

U.S. PATENT DOCUMENTS

Figure 1:
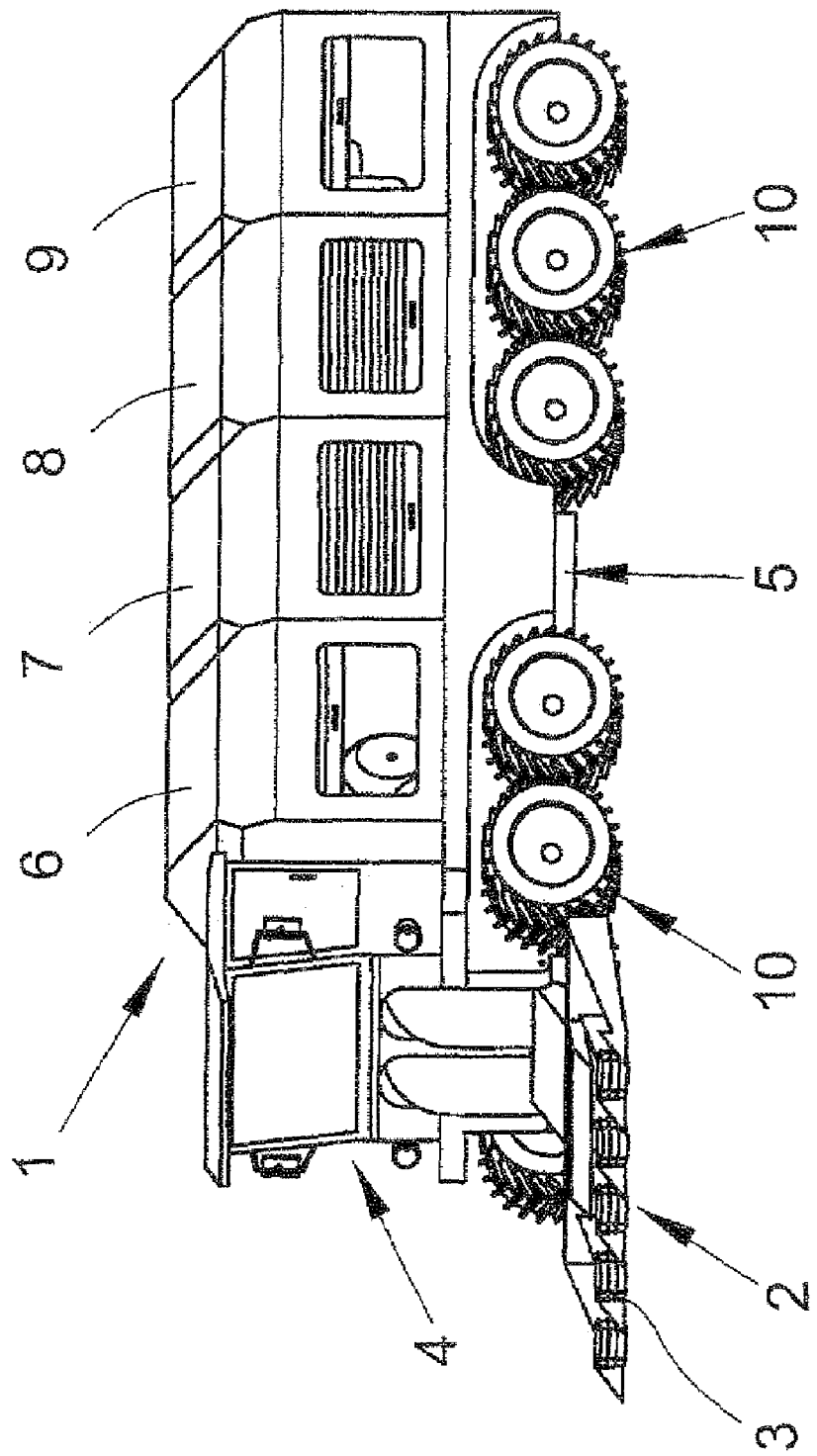

| | | | | |
|---|---|---|---|---|
| 3,558,426 | A | * | 1/1971 | Hess et al. .................. 162/30.1 |
| 3,759,677 | A | * | 9/1973 | White .......................... 48/209 |
| 3,920,708 | A | * | 11/1975 | Kubo et al. .................. 549/525 |
| 4,118,282 | A | * | 10/1978 | Wallace ....................... 201/2.5 |
| 4,145,188 | A | * | 3/1979 | Espenscheid et al. ....... 585/240 |
| 4,260,473 | A | * | 4/1981 | Bauer .......................... 208/14 |
| 4,618,736 | A | * | 10/1986 | Benn et al. .................. 585/240 |
| 4,851,600 | A | * | 7/1989 | Louw .......................... 585/240 |
| 5,278,325 | A | * | 1/1994 | Strop et al. ................... 554/12 |
| 5,288,934 | A | | 2/1994 | De Broqueville |
| 5,336,819 | A | * | 8/1994 | McAuliffe et al. ........... 585/240 |
| 5,569,801 | A | | 10/1996 | De Broqueville |
| 5,789,636 | A | | 8/1998 | Holighaus et al. |
| 5,849,964 | A | | 12/1998 | Holighaus et al. |
| 5,998,682 | A | * | 12/1999 | Chien .......................... 585/241 |
| 2006/0029715 | A1 | * | 2/2006 | Cheryan ...................... 426/601 |
| 2006/0211907 | A1 | * | 9/2006 | Pieter de Wet et al. ...... 585/864 |

FOREIGN PATENT DOCUMENTS

| | | |
|---|---|---|
| DE | 4311034 A1 | 10/1994 |
| DE | 4412941 A1 | 10/1995 |
| DE | 4421448 A1 | 1/1996 |
| DE | 4423394 C1 | 3/1996 |
| DE | 4435238 A1 | 4/1996 |
| DE | 19623528 A1 | 12/1997 |
| DE | 19809717 A1 | 9/1999 |
| DE | 69326527 T2 | 3/2000 |
| DE | 19902651 A1 | 7/2000 |
| DE | 10049277 A1 | 4/2002 |
| DE | 10049377 A1 | 4/2002 |
| DE | 10111765 A1 | 9/2002 |
| DE | 10158085 A1 | 9/2003 |
| DE | 10215679 A1 | 11/2003 |
| DE | 10316969 A1 | 12/2004 |
| EP | 0140811 A2 | 5/1985 |

OTHER PUBLICATIONS

Machine translation of DE10215679 A1—Feb. 20, 2009.*

J. Wiens, "Mobile Pyrolysis System for On-Site Biomass Conversion to Liquid and Solid Fuels", symposium papers energy from biomass and wastes, Jan. 21, 1980, pp. 713-720.

International Search Report completed on Dec. 8, 2005 in PCT/EP2005/008477.

Translation of the Written Opinion of the International Searching Authority mailed on Dec. 16, 2005 in PCT/EP2005/008477.

* cited by examiner

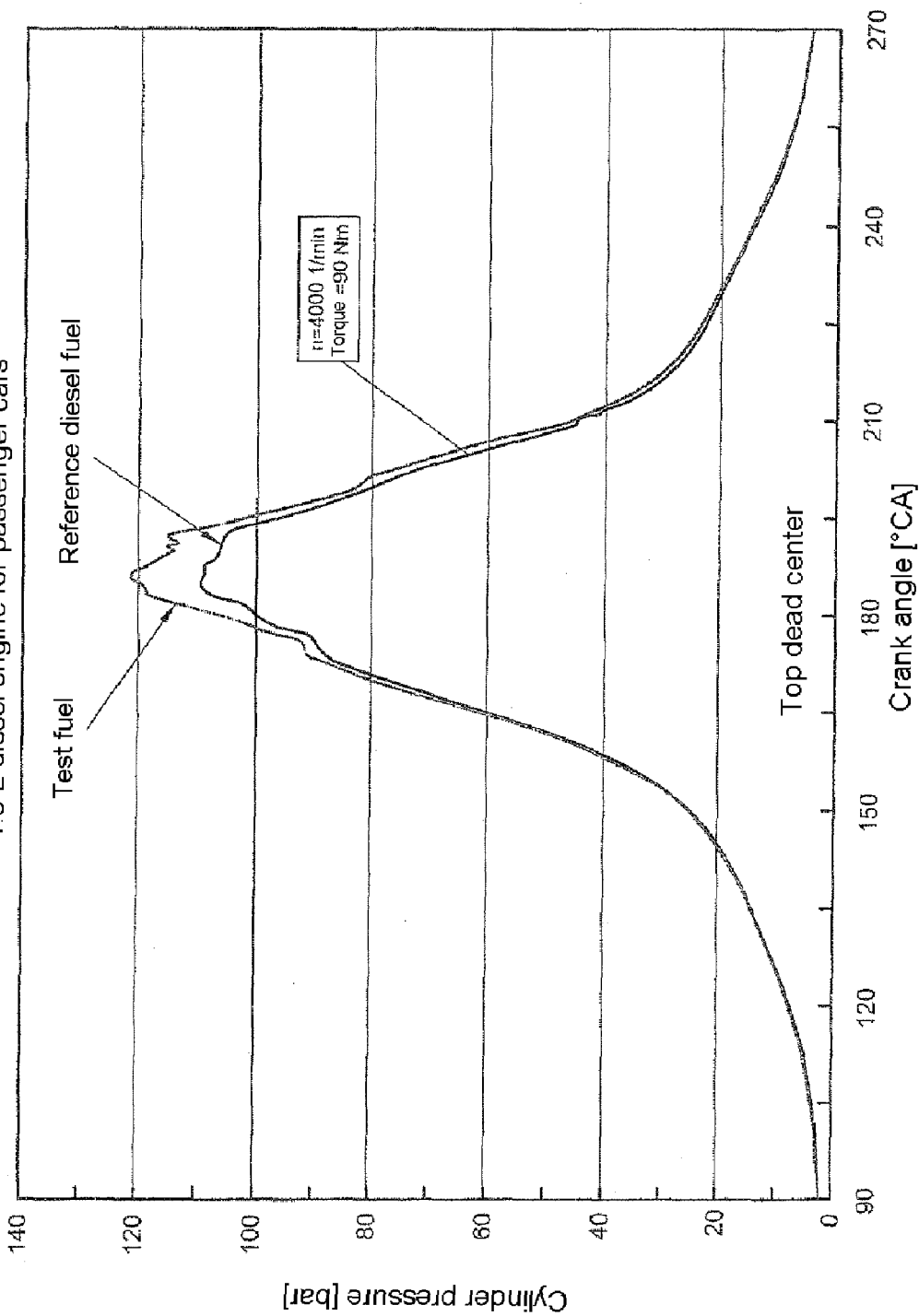

BIOMASS THERMAL OILING

This application is a national stage application under 35 U.S.C. 371 of international application No. PCT/EP2005/008477 filed Aug. 5, 2005, and claims priority to German Application No. DE 10 2004 038 220.4 filed Aug. 5, 2004, the disclosure of which is expressly incorporated herein by reference.

BACKGROUND OF THE INVENTION

The present invention generally relates to a process for the production of hydrocarbon-containing oils, to a system for this process which is equipped with an oilification module, to a process for the generation of electrical, kinetic, and/or potential energy, to a process for the preparation of a chemical product, to a chemical product obtainable by this process, to materials which are at least partially based on this chemical product or contain such products, to a method of transporting objects or conveying persons, and to the use of one of the processes described hereinabove or of the system described hereinabove in a sustainable energy management or for reducing the generation of greenhouse gases.

There is generally worldwide a high demand for energy sources which rely on renewable resources, as the result of the increasingly diminishing mineral oil deposits, and as a result of the greenhouse effect, which is based on the combustion of fossil fuels. The economy of having available these energy sources are of paramount importance if these energy sources, which rely on renewable resources, are to become widespread and popular. One aspect of the economical availability is the production costs, which must be at least competitive in relation to comparable mineral oil products, or indeed be more economical. Furthermore, it is advantageous for the economical availability if the energy source which relies on renewable resources can be provided with as little red tape as possible and without unduly high initial investments in equipment. Another imperative factor regarding economy is sustainability. Here, it is of particular importance that so-called "waste products" which are generated in a series of operations constitute a so-called "useful material" for energies which rely on renewable resources.

A series of publications are known from waste management, in which existing chemicals or reusable materials are processed by pyrolytic processes, in most cases at very high temperatures and with the use of suitable solid catalysts, to give products which have smaller molecular weights in comparison with the existing chemicals or reusable materials. Examples which can be mentioned in this context are DE 44 35 238 A1, DE 196 23 528 A1, DE 693 26 527 T2, DE 44 23 394 C1, DE 44 12 941 A1, DE 43 11 034 A1 and DE 198 09 717 A1.

However, only a few pyrolytic processes are known in the field of the production of fuels from renewable resources. Thus, DE 102 15 679 A1 discloses a direct thermochemical conversion of high-molecular-weight organic substances into liquid fuels of low viscosity, where shock heating of the biomass is employed, in combination with the circulation of a product phase of low volatility, gives a combustible liquid of low viscosity. The disadvantage of this process is that obvious and technically customary measures for controlling the residence time are not sufficient for this process. Also, the process described in DE 102 15 679 A1 is carried out at a pressure of 80 bar, so that the reactor must be designed specifically for such high pressures. The use of such a reactor in mobile plants for producing fuels from renewable resources is therefore not without problems.

Furthermore, DE 100 49 277 A1 discloses a process for the catalytic production of diesel oil and gasoline from hydrocarbon-containing waste materials and oils, such as timber, in which a solid catalyst on sodium-aluminum-silicate basis is used. The disadvantage of this process is that small solid particles, which include pieces of the solid catalyst, are disadvantageous, because of the risk of clogging the production system and of the resulting frequency down-times of an oilification plant, for a lasting, continuous, and hence economical operation of an oilification plant. It can be seen from the application DE 101 11 765 A1, which constitutes an addition to DE 100 49 377 A1, that it is predominantly the residues of catalyst which remain in this process and which cannot be regenerated. Rather, such residues of catalyst must be cleaned by complicated burn-off processes and, since such a cleaning procedure is generally only possible once, ultimately be disposed of.

One aspect of the present invention contributes to the solution of the problems which result from the prior art and help overcome the disadvantages resulting from the prior art.

In particular, the present invention provides a process for the oilification of renewable resources which can be operated in an efficient, sustainable, and economical manner. In this context, the fuels which can be obtained by this process should, if possible, be less carcinogenic and upon combustion in a combustion engine ensure as high a cylinder pressure as possible.

The present invention further provides a process and a system which can be operated in units which are as small and local as possible.

Furthermore, the present invention provides a process and a system which makes possible an operation with the shortest possible down-times.

In addition, one aspect of the invention is to make a contribution to a more sustainable energy strategy which relies less on fossil fuels.

Another aspect of the invention is to make a contribution to the promotion of structural change in agriculture or forestry.

DESCRIPTION OF THE PRESENT INVENTION

The present invention is a process for the production of hydrocarbon-containing oils, in which process a starting material containing a sugar and/or a sugar derivative is thermally cleaved, comprising a reaction step in which the starting material is brought into contact with a contact oil which has an initial boiling point, which may be determined as specified in DIN EN 60751, of at least about 200° C., such as at least about 250° C., such as at least about 300° C., such as at least about 325° C. and such as at least about 350° C. at a pressure of about 1013 mbar with formation of a reaction phase at a reaction temperature in the range of from about 200 to about 600° C., such as in the range of from about 250 to about 550° C., such as in the range of from about 300 to about 500° C. and such as in a range of from about 350 to about 450° C. and an absolute pressure in a range of from about 0.1 to about 50 bar, such as in a range of from about 0.5 bar to about 25 bar, such as in a range of from about 0.75 bar to about 10 bar, such as in a range of from about 0.9 bar to about 1.5 bar and under atmospheric pressure, and a processing step in which the reaction phase is separated into a low-boiling fraction and a high-boiling fraction, wherein at least a portion of the high-boiling fraction is recirculated into the reaction step as contact oil.

Surprisingly, it has been found that the process described in DE 102 15 679 A1 for the thermochemical conversion of high-molecular-weight organic substances into liquid fuels with low viscosity can also be carried out at pressures of not more than about 50 bar down to about 0.1 bar, such as under atmospheric pressure (approximately about 1013 mbar).

"High-boiling components" are understood as meaning, for the purposes of the present invention, compounds which have a boiling point, or in the case of a boiling range, an initial boiling point, of at least about 200° C., such as at least about 250° C., such as at least about 300° C., such as at least about 325° C. and such as at least about 350° C. under atmospheric pressure (i.e. about 1013 mbar). Accordingly, "low-boiling components" are understood as meaning compounds which have a boiling point, or a boiling range, of not more than about 200° C., such as not more than about 250° C., such as not more than about 300° C., such as not more than about 325° C. and such as not more than about 350° C. under atmospheric pressure.

The hydrocarbon-containing oils which can be obtained in the process according to the invention may be fuels which are liquid at room temperature and which may have a cetane number as specified in EN 590 of at least about 46, such as at least about 48, such as at least about 50, and such as about 54. Hydrocarbon-containing oils which may be used in accordance with the invention are petroleum, diesel, heating oil, gasoline or mixtures of at least two of these, where diesel is exemplary. The hydrocarbon-containing oils which can be obtained by the process according to the invention may have an aromatic hydrocarbon content, determined as specified in OENORM 12916, of not more than about 50% by weight, such as not more than about 25% by weight, such as not more than about 10% by weight, such as not more than about 5% by weight, such as not more than about 100 ppm and such as not more than about 1 ppm of aromatic hydrocarbons.

In the process according to the invention, the amount of starting material in the reaction phase may be in the range of from about 5 to about 80% by weight, such as in a range of from about 10 to about 70% by weight, such as in a range of from about 20 to about 60% by weight, and such as in a range of from about 25 to about 40% by weight, in each case based on the total reaction phase material.

Suitable sugars or sugar derivatives are all synthetic or naturally occurring sugar compounds which are known to the skilled worker. The term "sugar and/or sugar derivative" in accordance with the invention comprises mono-, di-, tri-, tetra-, penta-, oligo-, or polysaccharides. This applies independently on whether these sugars are cyclical, linear, branched, or crosslinked. Sugar derivatives which are suitable are all chemical reaction products formed from sugars. These include, for example, sugar esters, sugar alcohols, sugar thiols, sugar phosphates, sugar salts, sugar protein compounds, and the like. The abovementioned sugars or sugar derivatives can consist of sucrose, mannose, lactose, glucose, dextrose, or combinations of at least two of these. Examples of cyclical sugars are cyclodextrins. Examples of linear sugars are starch and starch derivatives. Examples of branched sugars are celluloses. Examples of crosslinked sugars are reticulated structures obtained from, for example, linear sugars or branched sugars by crosslinking reactions, as they are generated inter alia in paper, board, or cardboard making.

In accordance with the invention, the starting material may contain at least about 5% by weight, such as at least about 10% by weight, such as at least about 15% by weight, such as at least about 20% by weight of sugar and/or a sugar derivative, in each case based on the starting material. Besides these sugars and/or sugar derivatives, the starting material may contain accompanying substances. Besides other organic compounds such as proteins and the like, this is frequently water.

In addition, in the process according to the invention, the starting material may have a water content in the range of from about 0.001 to about 30% by weight, such as in the range of from about 0.01 to about 25% by weight, such as in the range of from about 1 to about 20% by weight, such as in the range of from about 5 to about 10% by weight, in each case based on the starting material. Certain amounts of water are exemplary in the process according to the invention since they firstly improve the stirability of the starting material and secondly because they help to discharge, from the hydrocarbon-containing oil, constituents, in particular solids, which are less soluble in oil, but more soluble in water, during the reaction step and the subsequent processing and can thus lead to an improved product quality of this oil.

Furthermore, in the process according to the invention, the starting material employed in the reaction step may contain to at least about 5% by weight, such as at least about 20% by weight and such as at least about 70% by weight, in each case based on the starting material, of particles with a particle size in the range of from about 0.001 to about 50 mm, such as in the range of from about 0.01 to about 40 mm, such as in the range of from about 0.1 to about 20 mm, and such as in the range of from about 1 to about 10 mm. The above-mentioned particle sizes can be determined by sieve analysis. The above selection of particle sizes makes possible firstly the provision of a homogeneous starting material, which leads to a reaction phase which can be stirred in a suitable manner. Such a reaction phase contributes to as uniform as possible a course of the reaction step where, in particular, no undesired delays in boiling take place.

In a further embodiment of the process according to the invention, the starting material may be brought to a temperature of more than about 40° C., such as more than about 50° C. and such as more than about 80° C., before being brought into contact with the contact oil, where a temperature of about 150° C., such as about 125° C. and such as about 100° C. is not exceeded. The advantage of this measure is that, firstly, the water content in the starting material can be controlled by this measure. Secondly, as a result of bringing pre-warmed starting material into contact with the contact oil, or the high-boiling fraction employed, as rapid and uniform as possible a conversion is achieved since the temperature of the reaction phase does not, as a result of markedly cooler starting material in those zones into which the starting material is introduced, drop below reaction temperatures which are too low for the production of hydrocarbon-containing oils.

In accordance with another embodiment of the process according to the invention, the starting material may contain at least one agricultural plant product containing the sugar and/or the sugar derivative. This product may constitute the main portion of the starting material. Agricultural plant products which are suitable are all plants which are employed in agriculture and which are known to a person skilled in the art. In this context, straw, hay, and crops are exemplary. Straw, hay, and crops constitute in each case exemplary embodiments. Straw which is suitable is, in particular, stems which are generated during the cereal harvest, or else rice straw or corn stems. Straw can furthermore be obtained from reed, oilseed rape, soya, sugar cane stems, or from bamboo. Hay which is suitable is all meadow clippings which are generated in agriculture. Thus, clippings from meadows, set-aside, dykes, football grounds, verges, and gardens, for example, may be used as hay. Crops which are suitable are fodder beet, sugar beet, swedes, turnips, scorzonera, carrots, herbaceous parts of mustard, fodder beet, potatoes, corn, cereals such as barley, wheat, oats, oilseed rape, peas, beans, soya, rice, or sugar cane, the fodder beet being exemplary. Each of the abovementioned examples of straw, hay, or crops constitutes an embodiment per se and can thus form a main component of the starting material.

In a further embodiment of the process according to the invention, timber, or leaves may also be employed as starting material or constituent of the starting material, in addition to the abovementioned agricultural products.

In a further embodiment of the process according to the invention, the starting material is harvested less than about two, such as less than about five, such as less than about ten or else less than about 15 hours before the reaction step. This can be accomplished for example by the reaction step following the harvesting step directly, where, if appropriate, a processing step is accomplished between the harvesting step and the reaction step, in which processing step the harvested agricultural product is prepared for the reaction step by being brought for example to the correct size and the suitable water content. The harvesting step can likewise be combined with one or more planting procedures. A planting procedure which is exemplary is, in particular, a crop rotation which is adapted to suit the soil conditions. In this context, a crop rotation which is exemplary is one in which cereals, such as barley, or soybeans are first planted and harvested in a harvesting step, such as in summer, and oilified in the reaction step. The cereal is then followed by beet as the crop, with swedes and turnips being exemplary. The beets are harvested, such as in the autumn of the same year, and oilified. It is then possible in the following spring, in the very field in which first cereal and then beet have been grown, to plant fodder beet in spring, and these can be harvested and oilified in autumn. Another crop rotation which is exemplary in accordance with the invention provides first growing sugar cane and directly after harvesting the sugar cane growing fodder beet. When the sugar cane or sugar beet is/are harvested, it is exemplary that, in the processing step which precedes the reaction, the sugar cane or the sugar beet is first macerated to give sugar-cane or sugar-beet juice which can be conveyed to the sugar processing facility, if appropriate in concentrated form, and pulp. The pulp thus obtained can be oilified in the reaction step which follows the processing step. It is however, also possible to likewise oilify the sugar-cane or sugar-beet juice.

With regard to the contact oil employed in the reaction step, the former may contain at least about 1% by weight, such as at least about 10% by weight, such as at least about 40% by weight, and such as at least about 70% by weight, in each case based on the contact oil, of a $C_{30}$-to $C_{80}$-, such as a $C_{40}$- to $C_{70}$-, and such as a $C_{50}$- to $C_{65}$-hydrocarbon. These hydrocarbons may contain at least about 10% by weight, such as at least about 50% by weight and such as at least about 70% by weight, in each case based on the hydrocarbon, of unbranched hydrocarbon molecules.

In one embodiment of the process according to the invention, the contact oil may be brought to a temperature of more than about 100° C., such as more than about 200° C., and such as more than about 300° C. before it is brought into contact with the starting material. The contact oil may be preheated to at least about 70%, such as at least about 85% and such as at least about 95% of the reaction temperature expressed in ° C. In this manner, a conversion which is as rapid and uniform as possible is achieved by bringing preheated contact oil into contact with the starting material, which has also been preheated.

In another embodiment of the process according to the invention, the contact oil is based to at least about 50% by weight, such as at least about 75% by weight, such as at least about 99% by weight, and such as at least about 99.9% by weight on the high-boiling fraction which is recirculated into the reaction step, for example after having separated off solids (see embodiments which follow).

In the process according to the invention, the reaction phase may contain less than about 0.05% by weight, such as less than about 0.1% by weight and such as less than about 1% by weight, in each case based on the starting material, of a solid catalyst. This solid catalyst may take the form of a molecular-sieve catalyst made of sodium silicate. As small catalyst quantities as possible, and an absence of solid catalyst in the process according to the invention, is exemplary for a continuous operation of the process according to the invention which is as smooth and continuous as possible.

The separation of the reaction phase obtained in the reaction step, into a low-boiling fraction and a high-boiling fraction, may be accomplished by first separating off the liquid phase, which is formed in the reaction phase under the pressure and temperature conditions of the reaction phase and which mainly comprises high-boiling components, where in the case of a continuous operation, this separating off may be accomplished via overflow valves. Moreover, the reactor phase which is gaseous in the reaction phase under the pressure and temperature conditions of the reaction phase and which, besides steam and the gaseous cleavage products formed upon the thermal cleavage of the high-molecular-weight compounds of the starting material, also comprises the oils which are in the vapor state under the pressure and temperature conditions of the reaction phase and oil droplets which are entrained by the gas phase, is conducted into a first cooling zone in which this phase, which is in the vapor state, is cooled by about 10 to about 100° C., such as about 20 to about 80° C., such as about 30 to about 70° C. and most such as by about 50° C., this cooling process being accomplished by means of heat exchangers, for example. Upon cooling, the high-boiling components which are present in the gaseous phase condense.

The condensed high-boiling components are now separated in a suitable first separation device, such as in a cyclone, from the gaseous phase which is still present after cooling and which comprises the low-boiling components. The condensed high-boiling components may be subsequently combined with the phase which has been separated off from the reaction phase and which is liquid under the pressure and temperature conditions of the reaction phase and which likewise comprises high-boiling components.

In a further process step, the high-boiling components are now conveyed to a device for separating off solids and, subsequently, after they have been freed from solids, stored as "high-boiling buffer", if appropriate in a tank for high-boiling components. A portion of the high-boiling components can then be recirculated from the high-boiling fraction into the reaction chamber in the form of contact oil.

The gaseous phase which is retained in the first separation device may be subsequently conveyed into a second cooling zone in which this gaseous phase is cooled to a temperature in a range of from about 10 to about 100° C., such as from about 20 to about 80° C., such as from about 30 to about 70° C. and such as to a temperature of about 50° C., the cooling process in this case also being accomplished by means of heat exchangers, for example.

The heat recovered in the two heat exchangers can be employed for example for prewarming the contact oil or the starting material.

In the second cooling step, the low-boiling components which are liquid after the second cooling process now condense and are then separated off in a further separation device, such as a further cyclone, from gaseous constituents which are still present after cooling process. These further constituents, which are still gaseous and which comprise, inter alia, methane, can be combusted and the heat which is recovered can likewise be utilized for preheating the contact oil and/or the starting material or for heating the reaction chamber. The condensed oil which has been separated off in this manner and which contains hydrocarbons and also water can already be employed directly as biodiesel fuel in combustion machines. However, it is also feasible to separate this product further, where the water present in the low-boiling component is eliminated and a further separation is subsequently accomplished, for example in a distillation or rectification device. Separating off the water from the oil constituents of this low-boiling phase may also be effected in a separator, such as a Westfalia separator, which not only makes possible the separating off of water, but also of solids which are still present, from the oil phase. In one embodiment of the process according to the invention, however, a further separation can be dispensed with, and the condensate obtained after the second cooling process can be employed as biodiesel fuel, if appropriate after the separating off of water and/or a further purification step, for example by means of filtration.

In one embodiment of the process according to the invention, it is the separation into a high-boiling fraction and a low-boiling fraction may not be affected by passing, through the reaction phase, a stream of carrier gas which selectively takes up volatile components from the reaction phase.

In the process according to the invention, at least a part of the high-boiling fraction obtained in the processing step is recirculated into the reaction step.

The process according to the invention can be operated continuously and batch wise, the continuous operation being exemplary.

In a batch wise operation, the starting material and the contact oil, which can be a commercially available oil or else the high-boiling fraction obtained in the processing step or a mixture of the two, are brought into contact under the abovementioned pressure and temperature conditions. This may be effected until no further thermal cleavage of the starting material employed takes place.

In the case of a continuous operation, the process according to the invention is operated over a prolonged period, such as at least about one hour, such as at least about five hours and such as at least about ten hours, such as at least about 24 hours, after the reaction has been started by bringing, for example, a commercially available heavy oil, which acts as contact oil, into contact with the starting material (start-up step of the reaction). Here, the process is carried out continuously by continually feeding in starting material and continually feeding in, as contact oil, the high-boiling fraction obtained during the process, once a stable state, in which temperature and concentration fluctuate by less than about 20%, such as less than about 15% and such as less than about 10%, has been reached.

The contact oil which can be employed for the start-up step of the reaction can be, in principle, any oil known to a person skilled in the art which has an initial boiling point of at least about 200° C., as described at the outset. Those oils may be employed as contact oils which are free from aromatic hydrocarbons.

Here, it is exemplary, when operating continuously, that at least the portion of the high-boiling fraction obtained in the processing step and which is recirculated into the reaction step to act as the contact oil is freed from solids particles, in particular from finely divided solids particles, before being recirculated. In this context, the contact oil may contain not more than about 20% by weight, such as not more than about 10% by weight, such as not more than about 5% by weight and such as not more than about 1% by weight of solids particles with a particle size of less than about 50 µm, such as less than about 25 µm, such as less than about 10 µm, such as less than about 1 µm and such as less than about 100 nm.

By freeing the high-boiling fraction from solids, it is possible to operate the process according to the invention over a long period after the start-up step, without it being necessary to add commercially available heavy oils to act as contact oils (with the exception of the start-up step of the reaction). Rather, the high-boiling fraction which is obtained in the processing step and which is recirculated into the reaction step successively replaces the contact oil which has been employed in the start-up step of the reaction and which is, if appropriate, commercially available. Accordingly, no further additional components are added during the continuous process, with the exception of the starting material.

Since, in the case of continuous operation, if solids are separated off from the high-boiling fraction which is recirculated into the reaction step and the possibility results that the process according to the invention can be operated continuously over prolonged periods of several hours—the contact oil which is originally employed in the start-up step is replaced successively by the high-boiling fraction obtained in the processing step, the contact oil in a particular embodiment of the process according to the invention is based to at least 50% by weight, such as at least about 75% by weight, such as at least about 90% by weight and such as at least about 99.9% by weight on the high-boiling fraction.

In the case of solids which are separated off from the high-boiling fraction which is recirculated into the reaction step before recirculation into the reaction step to act as the contact oil, they may be firstly the carbon residues which are generated in the reaction temperature range. In addition, insoluble constituents, in particular mineral constituents, may be generated as solids during the course of the process according to the invention, as the result of the accompanying substances which accompany the sugar in the starting material.

These solids can be separated off by various methods with which the skilled worker is generally familiar. Examples of these separation methods are distillation, filtration or sedimentation, or at least two of these, with sedimentation or filtration, or a combination thereof, being exemplary.

Each of the abovementioned methods for separating off the solid constitutes per se an embodiment of the process according to the invention.

In the case of filtration, the high-boiling fraction is passed through a sieve or a membrane. The sieves or membranes may have a mesh or pore size in the range of from about 1 to about 200 µm, such as in the range of from about 10 to about 100 µm, such as in the range of from about 20 to about 50 µm and such as about 30 µm. Also exemplary in this context are porous filter materials. These include ceramic surface filters which are highly resistant to chemicals and pressure and are in the form of bricks, hollow tubes or sheets, and also glass frits. To reduce the risk of clogging of the pores, such surface filters may be provided with an upper fine-pored filter layer, while the remainder is large-pored (multi-layer filter). Other basic materials of porous filter media can be coke, polymers, hard rubber, animal hides and sintered metal powders. Metal filters which have been produced by means of powder metallurgy may also be employed as porous filter media.

Suitable sedimentation methods are, in particular, two subtypes. Firstly, the solids particles—if they have a higher density than the high-boiling component—can be separated by settling. If the solids particles have a lesser density than the high-boiling fraction, they float on the high-boiling fraction in a static bath and can be removed from the surface of the high-boiling fraction. The other sedimentation method is based on the removal of the at least one solid by means of centrifugal forces. In a combination of filtration and sedimentation, for example in a centrifuge equipped with a filter, the high-boiling fractions which are contaminated with at least one solid can be thrown against the filter by means of the centrifugal force, during which process the solids remain on the filter and the high-boiling fractions penetrate across the filter and leave the latter in the solid-free state. The high-boiling fraction may be freed from the at least one solid by using so-called separators (also referred to as plate centrifuges). Westfalia separators from GEA AG, Bochum, Germany, may be employed for separating off the solids from the high-boiling fraction (and also for separating off any solids still present in the product oil), which are sold, inter alia, under the name "minimaXxSeparatoren". Other separators which are suitable are those separators mentioned in "Grundoperationen Chemischer Verfahrenstechnik" [Basic operations in chemical engineering], Wilhelm R. A. Vauck and Hermann A. Müller, Wiley-VCH-Verlag, 11th edition, 2000, on pages 233-235 as plate centrifuges.

In an embodiment of the process according to the invention, the solids are separated off from the high-boiling fraction which is recirculated into the reaction step to act as contact oil, for example, by first separating off, in a first separation step, solids by means of filtration, such as by means of metal-edge filters as they are obtainable for example from EDAK AG, Dachsen, Germany, it being exemplary to employ filters with a pore size of from about 20 to about 50 µm. The high-boiling fraction, which has already been partially freed from solids, is subsequently freed from further solids in a second separation step, using separators, such as Westfalia separators. If appropriate, this second separation step may be followed by a third separation step in which the high-boiling fraction is freed from further solids for example additionally by means of electrostatic filtration, using filtration systems as they are commercially available for example from FRIESS GmbH, Monheim, Germany, with the model names D2, D4, D4-1E, D8, D8-1E, D16 and D16-1E.

In an additional embodiment of the continuously operated process according to the invention, the solids are separated off from the high-boiling fraction by passing the high-boiling components into a suitable separation device after they have been condensed by the first cooling process of the gaseous reaction phase and after they have been combined with the liquid constituents removed from the reaction chamber. The high-boiling fraction which has been obtained after passing through the separation device and which has largely been freed from solids can then be stored for example in a tank for high-boiling components in the form of a "high-boiling buffer". In this context, the high-boiling components may be cooled to a temperature of at least about 150° C., such as at least about 100° C., before they are conveyed to the separation device.

A part of the high-boiling components which have been freed from solids can be recirculated into the reaction chamber to act as contact oil, either directly after having passed through the separation device for separating off solids, or else it is feasible to recirculate the high-boiling fraction into the reaction chamber, to act as contact oil, from the tank for high-boiling components in which the high-boiling components which have been freed from solids can "form a buffer".

The embodiment of the process according to the invention, according to which at least one reaction step is carried out continuously, and the embodiment of the process according to the invention in which a portion of the high-boiling component is fed continuously to the reaction step, furthermore contribute to the fact that the reaction conditions which prevail in the reaction step are kept as constant as possible. Exemplary in this context is that the portion of the high-boiling component is fed to the reaction chamber through nozzles. In this manner, as rapid and uniform a mixing as possible of the starting material and the contact oil, or the portion fed of the high-boiling component, if appropriate supported by a stirring mechanism, is achieved.

In an embodiment of the process according to the invention, this can also be accomplished with at least two reaction and processing systems which are connected in series. Here, the high-boiling fraction, which has been separated off in the first processing unit after processing the reaction phase obtained in the first reaction unit, and which has, if appropriate, been freed from solids is conveyed to the reaction step in the second reaction unit to act as contact oil. The high-boiling fraction which has been separated off, after processing the reaction phase obtained in the second reaction unit, is, as described above, freed from solids and can be recirculated into the reaction step of the first reaction unit to act as contact oil. The gas phases obtained in the two processing systems can be condensed individually or together to form the low-boiling phase and processed further.

In a further embodiment, the process may be carried out according to the invention in a production system located in a vehicle. One possibility here is to carry out at least the harvesting step and the reaction step on one and the same vehicle. Another possibility is to carry out the harvesting step on a separate vehicle and to transfer the starting material collected in the harvesting step to a further vehicle which is equipped with a production system and in which at least the reaction step can take place.

In accordance with another embodiment of the process of the present invention, silvicultural products as agricultural products may be employed. Silvicultural products are, particularly, timber or timber waste, as they can be generated for example during timber harvesting as the result of twigs and the like, or else in the further processing of the timer in the form of chips, slivers, shreds or sanding dusts. Thus, there is a possibility of employing the process according to the invention directly during timber harvesting, for example to oilify barks, branches or other timber residues which cannot be utilized in other ways and which are generated during timber harvesting. Again, it is exemplary here that a production system which is located in a vehicle and which performs at least one reaction step is employed on site during timber harvesting in the forest. The further processing of the timber can be carried out in timber-processing plants such as sawmills, works which produce pressboard or laminated sheets, joineries, or paper mills or wood pulp works. The use of the process according to the invention in each of the abovementioned timber-processing plants for utilizing timber waste is an embodiment of the process according to the invention. Furthermore, the process according to the invention can also be employed for utilizing large amounts of leaves which are generated in particular in autumn, in order to oilify them. Also, the needles of coniferous trees such as firs, spruces, pines, or larches, and which are generated in particular in the management of public parks can be oilified by the process according to the invention.

The present invention also relates to a system which is equipped with an oilification module, at least equipped with the following, material-conveying, intercomponents:

a starting-material feeder, a reaction chamber which is connected to the starting-material feeder and to which a pressure can optionally be applied, where, particularly in the case of molecules which are difficult to crack, such as lignin, this reaction chamber may be equipped with a microwave, a separating means which is arranged downstream of the reaction chamber and is equipped with an outlet for low-boiling components and an outlet for high-boiling components, where a fractionating unit is arranged downstream of the outlet for low-boiling components, where a solids-removal unit is arranged downstream of the outlet for high-boiling components, where the solids-removal unit is equipped with a liquid outlet and a solids outlet, where the liquid outlet is connected to the reaction chamber via an oil return line, either directly or, if appropriate, via a tank for high-boiling components.

In the system according to the invention, the starting-material feeder may be equipped with a pressure valve. Starting material is conveyable against this pressure valve, which borders the reaction chamber or which is located within the reaction chamber, via one or more conveying means which are likewise located in the starting-material feeder. The conveying means can be a conveyor belt, a screw conveyor or a plunger conveyor, where a screw conveyor is exemplary, not least with a view to the continuous operation of the oilification module. Furthermore, the pressure valve may contain an element which is at least partly spherical and which may be spring-urged. This element may be at least partially made of ceramic. Moreover, starting-material feeder is equipped at the reaction-space side with distributing elements which serve for as uniform as possible a distribution of the starting material in the reaction chamber and which are designed as distributor blades. The starting material is thus introduced into the starting-material feeder which is equipped with a continuously operating conveying means which may be at least in part designed as a screw.

Furthermore, the starting-material feeder can be heated by means of a feeder heating element. This feeder heating element may be provided at least partially in the zone of the continuously operating conveying means externally of the reaction chamber.

Also, in the system according to the invention, the reaction chamber may be equipped with a reactor heating element for heating the reaction chamber. The feeder heating element and also the reactor heating element can be designed simultaneously or else independently of one another as electrical heating elements, hot-air heating element, oil-heating element or gas-heating element. In particular in the case of products which are difficult to crack such as lignin, a microwave-emitting device may be employed as the heating element.

In an additional embodiment of the system according to the invention that the reaction chamber is equipped with a mixing device. A suitable mixing device is any stirring equipment which is known to a person skilled in the art. Another form of the mixing device is nozzles, by means of which for example the contact oil or the high-boiling fraction which is reused as contact oil can be sprayed in order to ensure a suitable mixing of the reaction phase.

In an embodiment of the system according to the invention, the reaction chamber is designed in the form of a trough, the bottom of which accommodates the contact oil. The starting material can, within the reaction chamber, be pulled or pushed from the site of entry of the starting material through the contact oil by means of suitable pushing devices such as, for example, a rotating screw.

Also, according to the invention, the separating means may be designed as thermal or mechanical separator or a combination thereof, where each separating means variant constitutes an embodiment of the system according to the invention. Thermal separating means are understood as meaning separating means which exploit the differences in the boiling point of the various hydrocarbon-containing oils which are formed in the reaction phase. Typical thermal separating means are distillation or rectification columns. When a separator or a cyclone is employed, a cooling module may be provided upstream of these as component of the separating means. This cooling module is designed in such a way that the gas mixture which exits the reaction chamber can be cooled in the separating means by a temperature of about 50° C. The cooling modules may be tubular heat exchangers, such as tube-bundle heat exchangers. Mechanical separating means are understood as meaning, in accordance with the invention, systems which make possible a separation of substance mixtures not on the basis of different temperatures, but by exploiting different molecular weights. Mechanical separating means are exemplary in oilification modules in particular on the basis of their compact shape and have a high oilification efficiency combined with low space and weight requirements. Typical mechanical separating means are separators which operate by the centrifugal principle, centrifuges or cyclones, where cyclones, which accomplish the separation by using streams of gas, are exemplary. Such cyclones or separators can be obtained for example from Westfalia Separator GmbH, Germany.

Furthermore, the system according to the invention can be equipped with systems as separating means which operate by the strip principle or the osmosis principle.

Furthermore, in accordance with the invention, the system is equipped with a tank for high-boiling components which is arranged in such a way that the high-boiling components can be passed into the tank after it has passed through the solids-removal unit. This tank for high-boiling components can furthermore be provided with an oil return line by means of which high-boiling components can be recirculated from the tank for high-boiling components into the reaction chamber to act as contact oil. In this case, the liquid outlet of the solids-removal unit is not connected directly the reaction chamber, but via the tank for the high-boiling components.

The fractionating unit likewise may take the form of a separating means comprising a cooling module, which separating means may be a distillation or rectification device or else a separator, where the cooling module may be designed in such a way that the gaseous low-boiling components which exit the first separating means can be cooled to a temperature of about 50° C.

Moreover, in one embodiment of the system according to the invention, the separation of the solids may be performed in at least two separation zones. The above-described mechanical separating means can likewise be employed in these separation zones. Here, the first separation zone may be equipped with a mechanical separating device, such as a metal-edge filter. Moreover, in the system according to the invention, the further separation zone may be equipped with a separator, such as a Westfalia separator. Moreover, in accordance with the invention, the solids-removal unit may be equipped with a cooling module which is arranged in such a way that the high-boiling fraction introduced into the solids-removal unit can be cooled to a temperature of not more than about 100° C. prior to being separated off.

Moreover, in the system according to the invention, a solids-to-energy conversion unit may be arranged downstream of the solids-removal unit. In principle, all solids-to-energy conversion units which are known to the skilled worker are suitable in this context. The solids-to-energy conversion unit may be a combustion unit which provides heat energy for heating the various heating elements of the oilification module.

Also, in the system according to the invention, the oil return line may be equipped with a return-line heating element. In this manner, the portion of the high-boiling fraction which acts as the contact oil and which is introduced into the reaction chamber via the oil return line can be preheated to the reaction temperature so that no considerable temperature inhomogeneities occur within the reaction phase which might have a disadvantageous effect on the process and on the product quality.

Also, in the system according to the invention, at least one further reaction chamber may be arranged downstream of the outlet for high-boiling components.

In another embodiment of the system according to the invention, the oilification module may be arranged downstream of a harvesting module. In accordance with an additional embodiment of the system according to the invention, the oilification module can be arranged directly downstream of the harvesting module. In accordance with another embodiment of the system according to the invention, a further module can be arranged between the harvesting module and the oilification module, such as a processing module in which the harvest of the harvesting module can be, for example, comminuted further or predried. Furthermore, the system according to the invention may be arranged on a vehicle. The measures described in this paragraph permit the harvesting of agricultural plant products which are suitable as starting materials and the feeding to an oilification process which is carried out as soon as possible. Consequently, the system according to the invention may be employed in the process according to the invention for the production of hydrocarbon-containing oils.

The present invention furthermore relates to a process for the generation of kinetic, electrical and/or potential energy, where an energy generator employs oil obtainable by the process according to the invention for the production of hydrocarbon-containing oils. Energy generators which are suitable are, in principle, all suitable systems which are known to a person skilled in the art. Exemplary energy generators are combustion engines such as Otto engines, diesel engines, Wankel engines, steam engines, turbines or jet engines. A further group of energy generators is fuel cells. In particular, the products which are gaseous at about 20° C. and which are generated in the process according to the invention for the production of hydrocarbon-containing oils, in particular methane, ethane, propane or butane, such as methane or ethane and such as methane, can be employed in these fuel cells.

The invention also relates to a process for the preparation of chemical products, where an oil or gas obtainable by the process according to the invention for the production of hydrocarbon-containing oils is subjected to a chemical reaction. Suitable chemical reactions are all chemical reactions which are known in the field of petrochemistry. Thus, starting materials can be obtained by suitable chemical processes, in particular by thermal cleavage, which can be converted by further reactions, such as addition or polymerization reactions, to give intermediates or polymers. Thus, the invention also relates to chemical products comprising, or at least in part being based on, an oil or gas obtainable by the process according to the invention for the production of hydrocarbon-containing oils. Chemical products which are to be mentioned in particular are fibers, films, molding materials, foams, paints, films or fluids. The invention furthermore relates to materials containing, or at least in part being based on, chemical products or chemical products obtainable by the process according to the invention for the production of hydrocarbon-containing oils. The present invention furthermore relates to a method of transporting objects or conveying persons, where a transporting means obtains the energy for the transport at least in part from an oil or gas obtainable by the process according to the invention for the production of hydrocarbon-containing oils. Suitable means of transport are all means of transport which a person skilled in the art considers to be suitable. Examples which may be mentioned are land craft such as automobiles, heavy goods vehicles, construction vehicles, buses, motorcycles and the like, watercraft such as ferries, container ships, passenger ships, hovercraft and the like, aircraft such as commercial aircraft, fighter planes, rockets, helicopters or airships.

A further embodiment of the process according to the invention for the production of hydrocarbon-containing oils provides that the starting material is provided by one person and the reaction step is carried out by another person. The different persons may be persons which differ from one another on the basis of their legal status. Thus, the person who provides the starting material can be for example a farmer or an employee of an agricultural business which is at least not in immediate possession of the system according to the invention. The other person who carries out the reaction step may belong to a business that owns the system. Such a business may have either the purpose of hiring out the system according to the invention together with personnel, for example in order to harvest the field which has been planted with agricultural plant products and to carry out the oilification, or else the purpose of buying, and oilifying, precursors which are suitable as starting material and which have been produced by third parties.

In addition, the invention relates to the use of one of the processes described herein or one of the systems described herein in a sustainable energy management or for reducing the generation of greenhouse gases. The invention is now illustrated in greater detail with reference to nonlimiting figures and examples.

Figure 2:
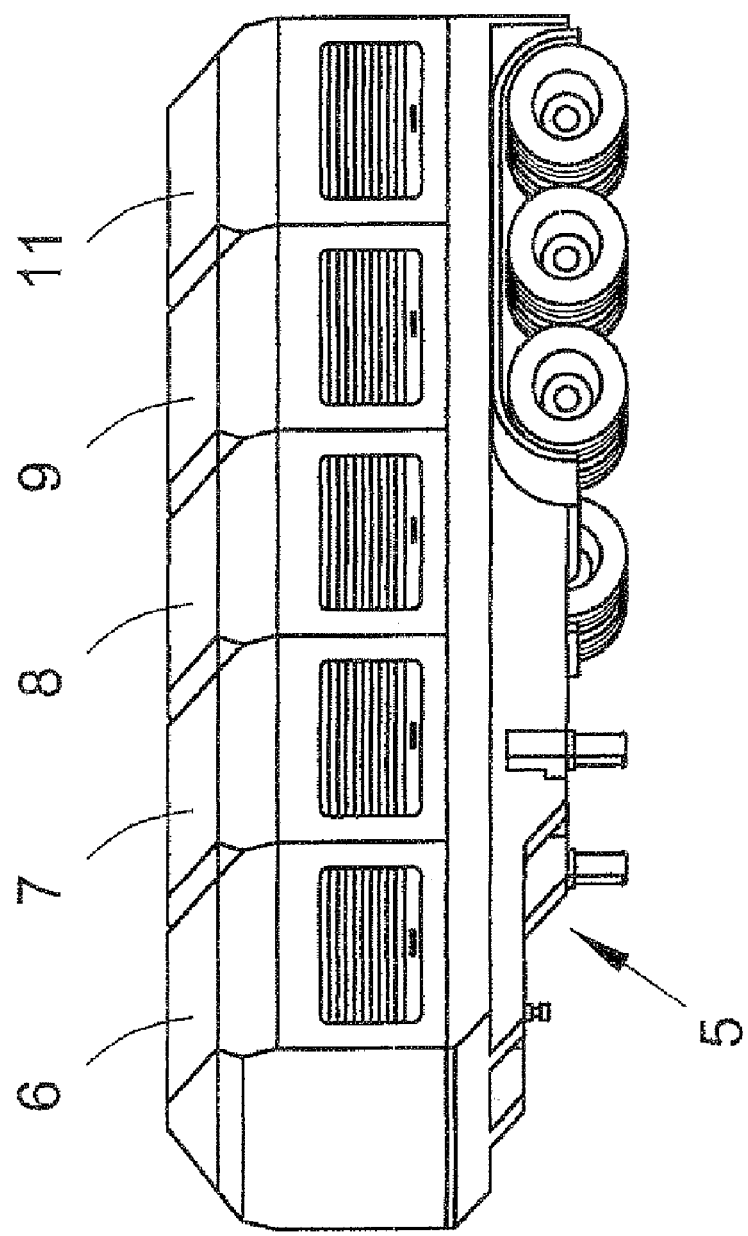
Figure 3:
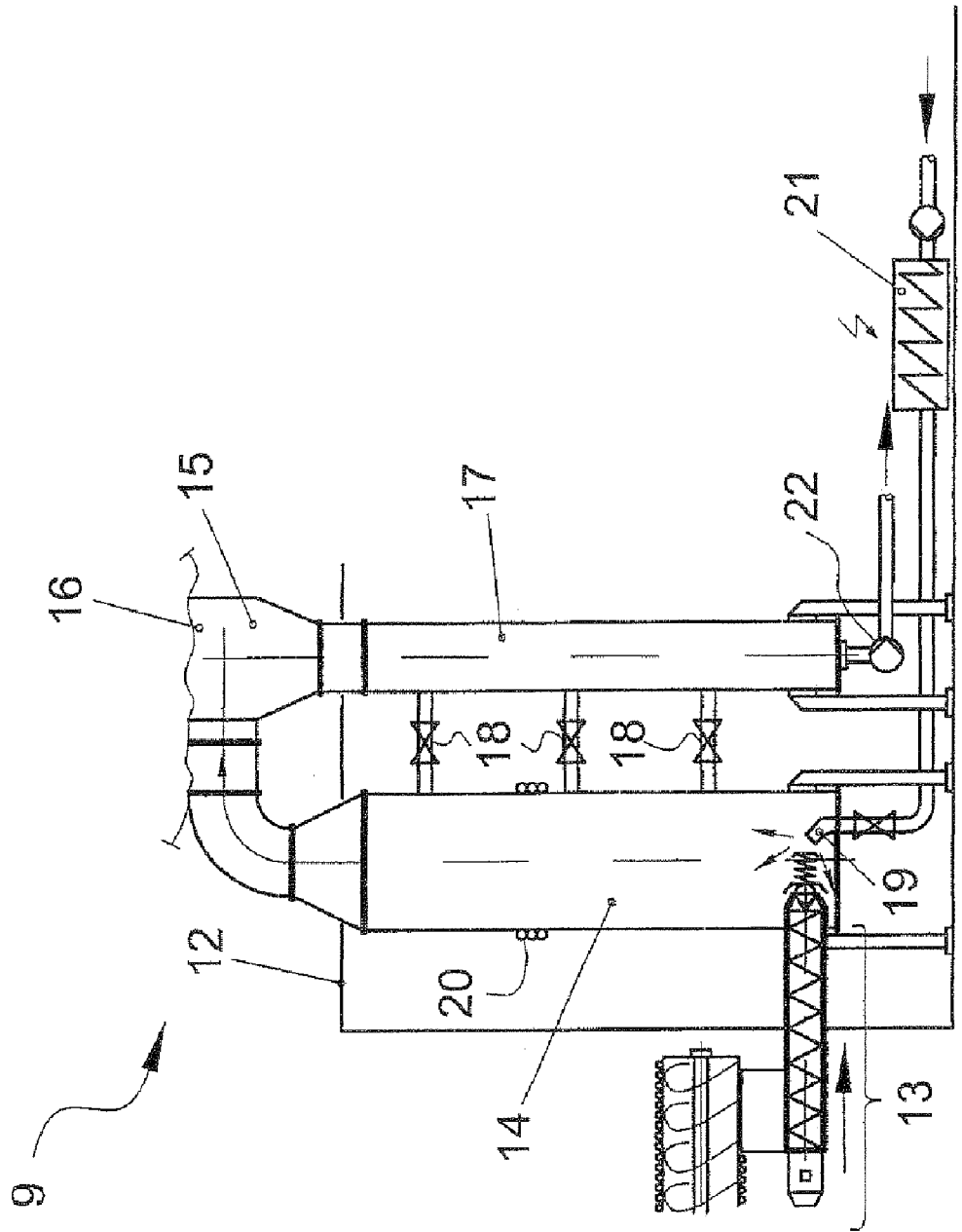
Figure 4:
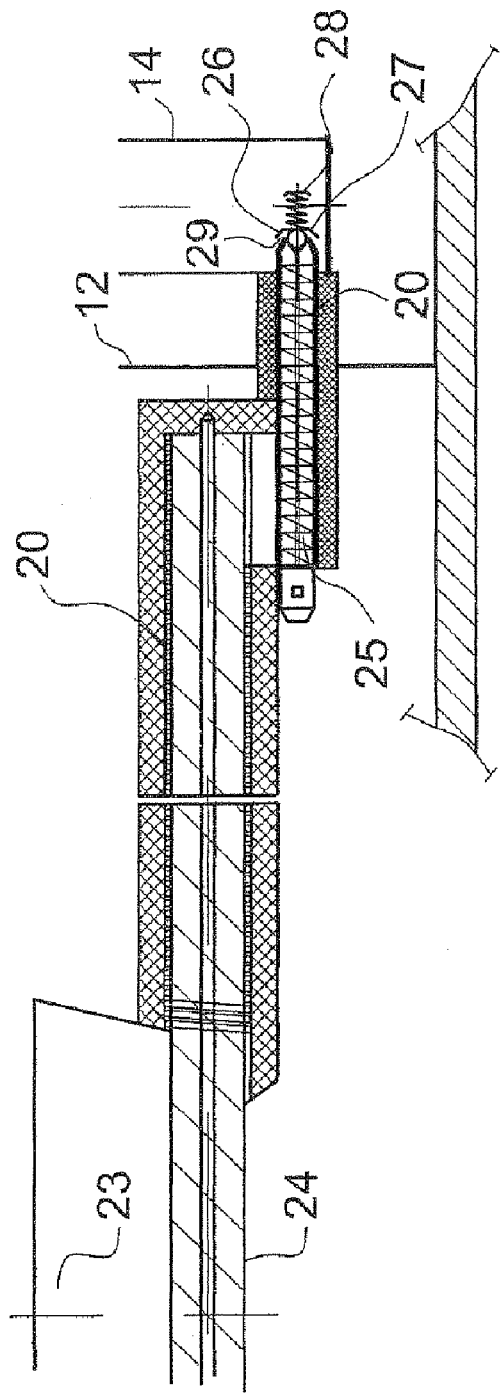
Figure 5:
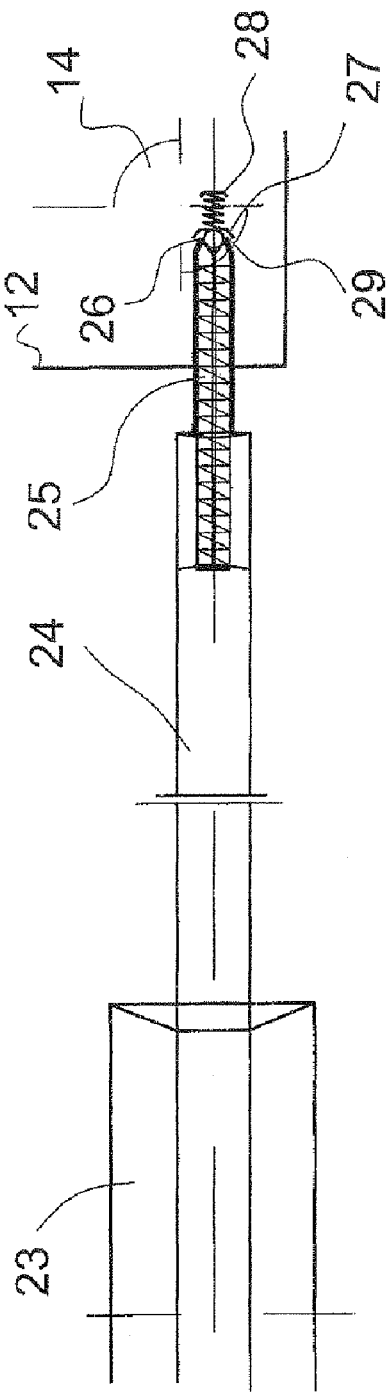
Figure 6:
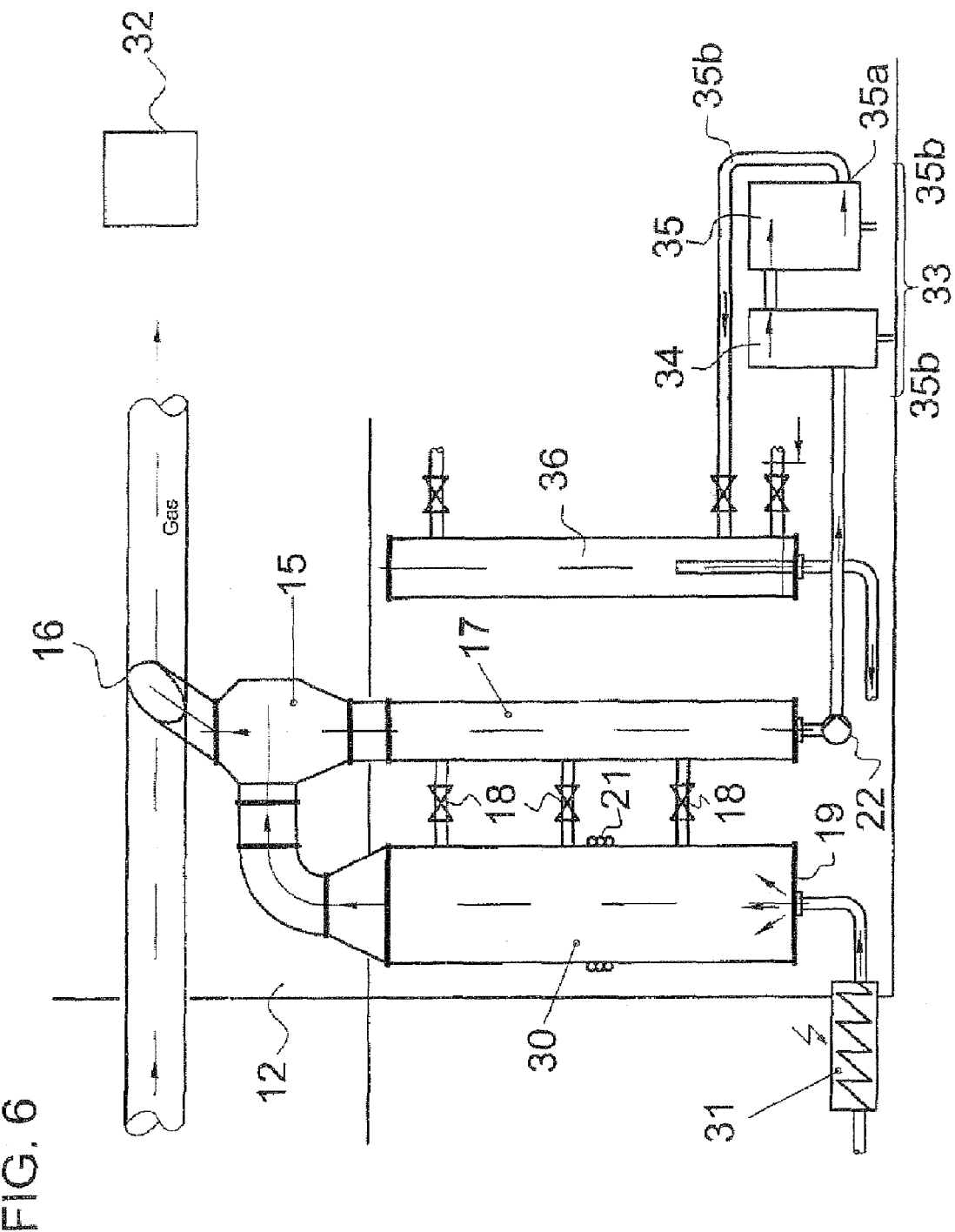
Figure 7:
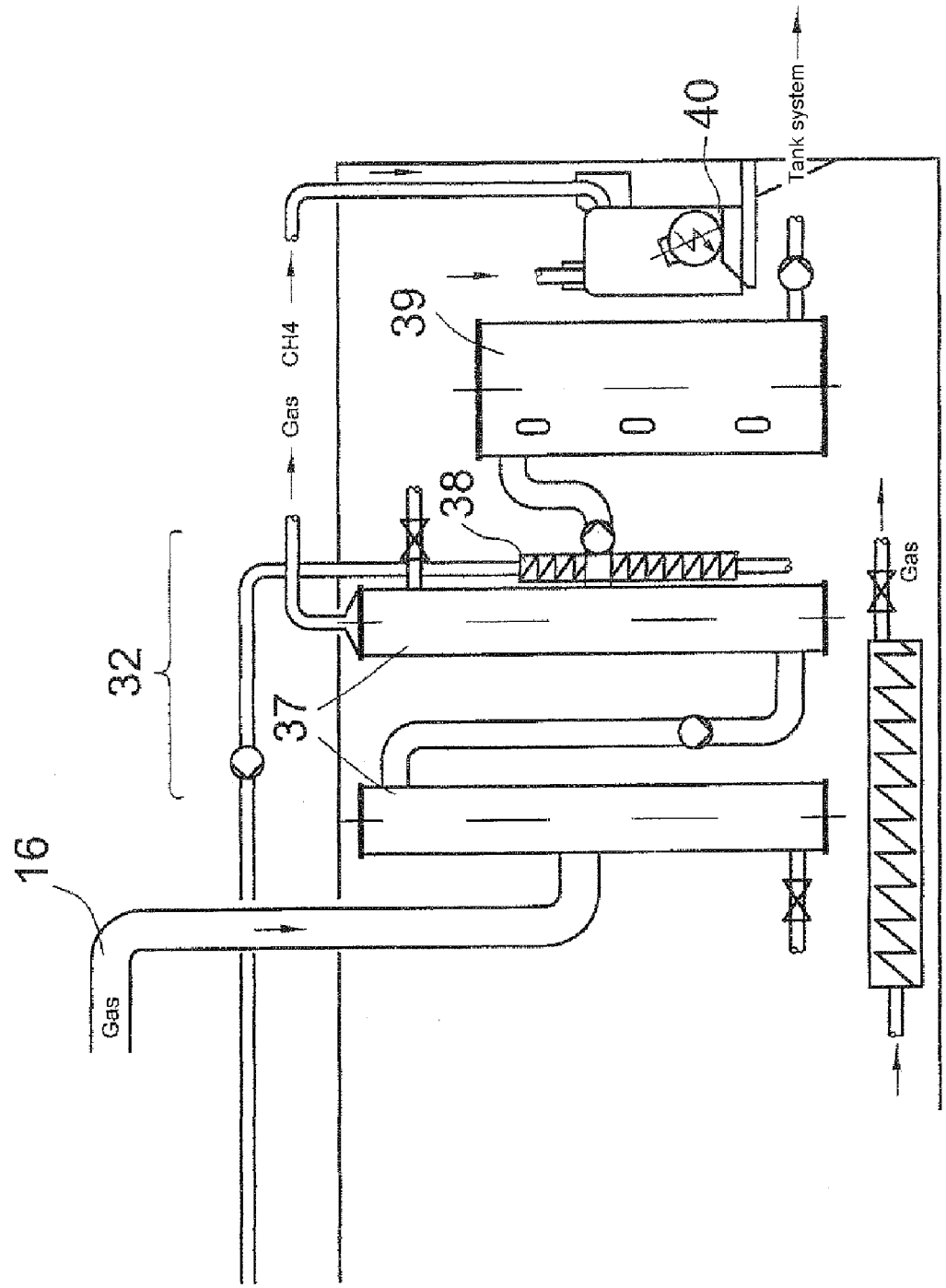
Figure 8:
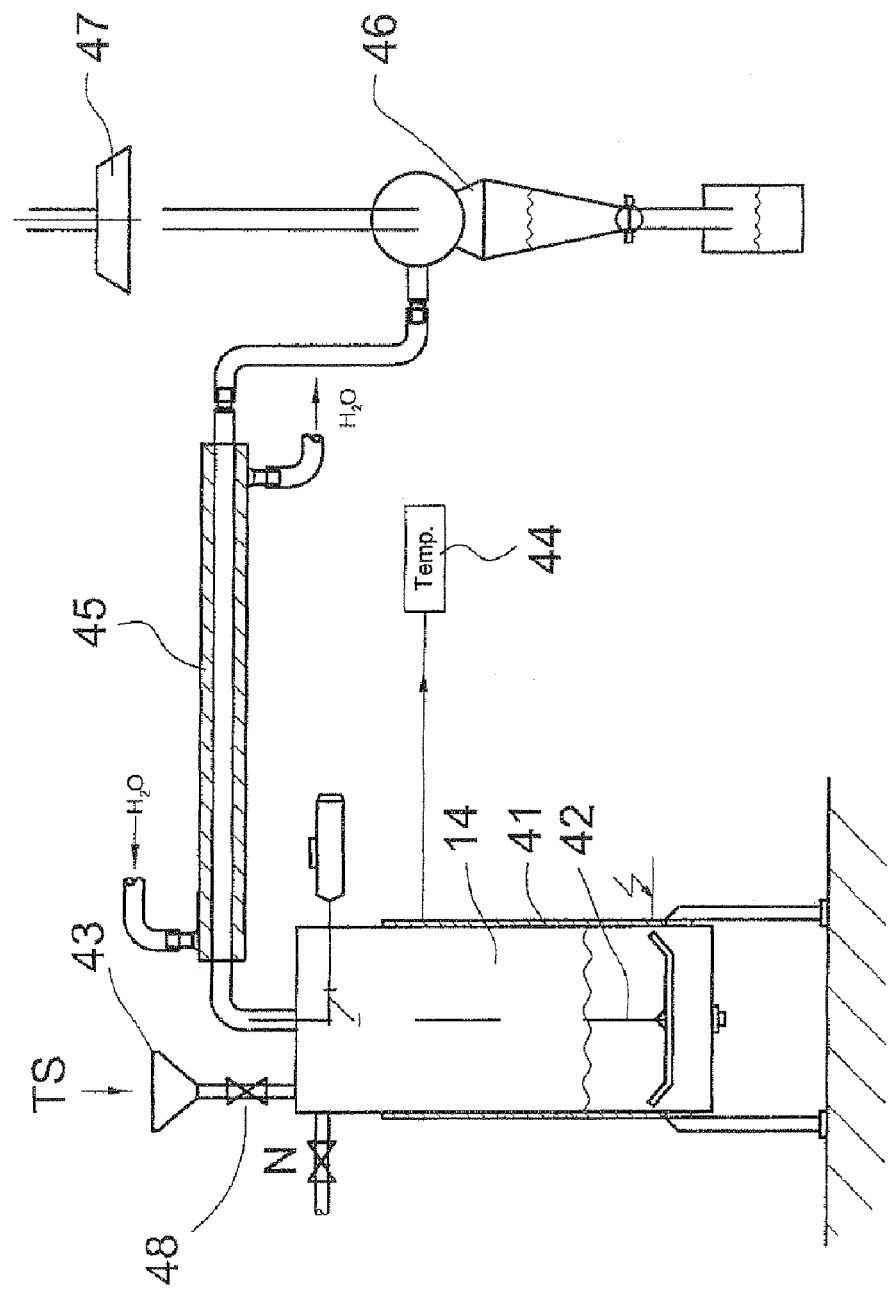

To illustrate the invention in greater detail, the figures show:

FIG. 1 is a perspective view of a harvesting vehicle with oilification module in accordance with an embodiment of the present invention, FIG. 2 is a perspective view of a mobile oilification module in accordance with an embodiment of the present invention, FIG. 3 is a diagrammatic cross section of an oilification module in accordance with an embodiment of the present invention, FIG. 4 is a cross section across a starting-material feeder in accordance with an embodiment of the present invention, FIG. 5 is a horizontal cross section of a starting-material feeder in accordance with an embodiment of the present invention, FIG. 6 is an oilification module with two reaction chambers in accordance with an embodiment of the present invention, FIG. 7 is a diagrammatic cross section of a fractionating unit in accordance with an embodiment of the present invention, FIG. 8 is a diagrammatic cross section of a test plant in accordance with an embodiment of the present invention, FIG. 9 is a graphic representation of cylinder-pressure curves in accordance with an embodiment of the present invention.

FIG. 1 shows a harvesting vehicle 1 which is equipped with a harvesting attachment 2 for agricultural plant products, also referred to as energy plants. The harvesting attachment 2 is equipped with a series of cutting devices 3 by means of which the energy plants are harvested. The harvesting attachment 2 is supported by a chassis 5 and is within the view of a cabin 4. The harvesting attachment 2 is followed by a processing unit 6 in which, if appropriate, the energy plant chips are comminuted further, freed from water or soiling or else compacted. If plant juices which can be utilized further are generated in the processing unit 6, as is the case for example in sugar beet or sugar cane processing, a plant juice tank 7 which can accommodate these plant juices is arranged downstream of the processing unit 6. Moreover, a starting-material tank 8 can be arranged downstream of the processing unit 6, in most cases downstream of the plant juice tank 7. The starting material can be dehydrated further and compacted in this starting-material tank. An oilification module 9 is arranged downstream either directly of the processing unit 6 or of the starting-material tank 8, in which oilification module the starting material is oilified by the effect of heat in the presence of an organic contact oil and, if appropriate, the resulting oil is refined. The chassis 5 is furthermore equipped with a multiplicity of driven wheels 10 which permit locomotion of the harvesting vehicle 1 which causes as little damage to the soil as possible.

FIG. 2 represents a system which is comparable with the harvesting vehicle, but is not self-propelled and designed as a trailer. As regards the meaning of reference symbols 5, 6, 7, 8 and 9, reference is made to what has been said about FIG. 1.

FIG. 2 shows a fermenter 11 which can optionally be connected with the plant juice tank 7 and in which gas, such as methane, can be obtained from the plant juice by suitable enzymes, which gas can be used firstly for generating energy and secondly for heating the oilification module. In the event that, instead of energy plants, other residues generated in a variety of industrial processes, such as timber waste or else animal waste, are to be oilified, a system which is suitable for this purpose is not equipped with a plant juice tank 7 and fermenter 11. Rather, the timber waste, originating for example from a sawmill, a wood-processing plant, or the animal waste, which can originate for example from a reindeer's, can be fed directly to the oilification module 9 as starting material.

FIG. 3 shows an oilification module 9 with a housing 12 with a starting-material feeder 13, an optionally pressurizable reaction chamber 14 connected therewith and which may be designed as a stainless-steel reactor, a separating means 15 which is arranged downstream of the reaction chamber and which is equipped with an outlet for low-boiling components 16 and an outlet for high-boiling components 17. The outlet for high-boiling components 17 may be designed in tubular form and arranged vertically and is equipped with a series of fractionating valves 18 by means of which a return ratio for liquid high-boiling components into, or out of, the reaction chamber 14 can be set. In the lower zone of the reaction chamber 14 there is arranged a nozzle 19 by means of which it is possible to mix the reaction phase present in the reaction chamber 14 by injecting oil. Moreover, the outside of the walls of the reaction chamber 14 are surrounded at least in part with heating elements 20 which, together with the heating elements 21 which warm the oil injected into the reaction chamber 14, provide the reaction temperature within the reaction chamber 14. In the lower zone of the outlet for high-boiling components 17, there is a valve 22 for the high-boiling components which likewise together with the fractionating valves 18 regulates the filling level of the outlet for high-boiling components 17 and thus the return ratio. The high-boiling fraction which is transferred outwardly via the valve 22 for high-boiling components is conveyed to a solids-removal unit 33, this solids-removal unit 33 may be operating in two stages and being equipped firstly with a mechanical separation device 34, for example a metal-edge filter, and downstream there from a further mechanical separation device 35, such as a separator (see FIG. 6). The high-boiling fraction which has been purified thus is stored in a tank 36 for high-boiling components. A portion of the high-boiling components can be introduced into the first reaction chamber 14 via the heating element 21 by means of the nozzle 19, out of the tank 36 for high-boiling components or immediately after leaving the solids-removal unit 33.

FIGS. 4 and 5 describe the starting-material feeder 13 in greater detail. The feeder has first a collecting funnel 23 for receiving the starting material which is conveyed, by means of a first conveying means 24, which is designed as a screw, continuously from the collecting funnel 23 towards the reaction chamber 14. Downstream of the first conveying means 24 there is arranged a second conveying means 25 which conveys the starting material through a conveyor which is designed as a screw towards a spherical closure 26. The spherical closure 26 is equipped with a ball 27 which is pressed onto the opening 29 of the closure by means of a spring hanger 28. During the conveying of starting material, the latter presses against the ball 27 which, in turn, moves against the spring pressure of the spring hanger 28 and, as a result of this movement, opens up the opening 29 of the closure at least in part so that the starting material can enter the reaction chamber 14.

FIG. 6 shows a further reaction chamber 30 which may follow the first reaction chamber 14 and in which, starting from the valve 22 for the high-boiling components, a heated pipeline 31 introduces high-boiling components into the lower zone of the further reaction chamber 30. Analogously to the first reaction chamber 14, a separating means 15 with an outlet for low-boiling constituents 16 and an outlet for high-boiling constituents 17 is again arranged downstream of the further reaction chamber 30. The outlet for low-boiling constituents 16 of the further reaction chamber 30 is connected with the outlet for the low-boiling components 16 of the first reaction chamber 14 by means of a pipeline. A fractionating unit 32 may be arranged downstream of the outlet for low-boiling components 16 (see FIG. 7), in which unit firstly the water which is present in the low-boiling component is separated off and the low-boiling components can be processed to give gasoline, diesel or heating oil fractions, either by distillation or by mechanical separation or by a combination of these. The high-boiling fraction removed via the valve 22 for the high-boiling components is conveyed to a solids-removal unit 33, which may be equipped with a liquid outlet 35a and a solids outlet 35b, this solids-removal unit 33 operating in two stages and being equipped with a first mechanical separation device, such as a metal-edge filter 34 and, downstream from the first separation device, a second mechanical separation device, such as a separator 35. The high-boiling fraction which has thus been purified is likewise stored in a tank 36 for high-boiling components as "high-boiling buffer". From this tank 36 for high-boiling components, a portion of the high-boiling component can be introduced into the first reaction chamber 14 via the heating element 21 by means of the nozzle 19.

FIG. 7 shows a fractionating unit 32 with a distillation zone equipped with two or more distillation units.

The fractionating unit 32 may be coupled with a heat-recovery means 38, for example, in the form of a heat exchanger or heat pump, in order to provide the energy which is recovered by the cooling in the fractionating unit 32, which is operated by distillation, for, for example, prewarming the screws. The purified oil product obtained from the fractionating unit 32 is passed to a tank 39 for intermediate storage. The constituents which are generated during the processing in the fractionating unit 32 and which are gaseous at room temperature are fed to a generator 40, where energy is generated by means of a combustion engine which can be used at least for part of, such as for all of the energy requirement of the oilification module 9 or the harvesting vehicle 1.

FIG. 8 shows an experimental set-up in which a reactor 41 forms a reaction chamber 14 which accommodates a stirrer 42 and which can be charged with starting material via a starting-material inlet 43 while being regulable via a starting-material valve 48. Furthermore, the reactor 41 is equipped with a heating means which can be controlled via the control 44. In the upper zone of the reactor 41, this is followed by a condenser 45 which discharges into a separating means 46 which is arranged underneath a conduit 47.

FIG. 9 is a graphic representation of cylinder-pressure curves of a biodiesel produced by the processes according to the invention and a conventional, commercially available diesel fuel in a 1.9 l diesel engine for passenger cars at 4000 revolutions per minute, a torque of 90 Nm.

EXAMPLE

A system as shown in FIG. 3 (reactor only) comprising a stainless-steel reactor with a reactor volume of 1000 liters which had been preheated to a temperature of 360° C. was charged continuously with straw with a water content of approximately 8% by weight which had been comminuted down to a particle size of on average 5 mm and prewarmed to a temperature of 100° C. At the same time, such an amount of contact oil which had been prewarmed to a temperature of 360° C. was introduced into the reactor that the straw:contact oil ratio within the reactor was always approximately 1:3. The drop in temperature which was caused inside the reactor by the addition of straw at a temperature of 100° C. was compensated for by suitably increasing the temperature of the contact oil introduced, so that the temperature inside the reactor was constantly approximately 360° C. Upon starting up the reaction, a commercially available heavy oil from BP with an initial boiling point of more than 200° C. under atmospheric pressure was employed.

The components were mixed in the reactor by means of a stirring device, resulting in a temperature of 360° C. within the reactor for the thermal cleavage of the straw. The gaseous phase in the reaction chamber was brought into contact by means of a conventional tube-bundle heat exchanger and cooled by approximately 50° C., resulting in the condensation of high-boiling components. The high-boiling components were separated off by means of a conventional cyclone and, after having been cooled to a temperature of approximately 100° C., freed from solids by means of a metal-edge filter from Mahle GmbH (type AF 7383-521-50700/S1) and subsequently by means of a Westfalia separator (OTC2-02-137). The high-boiling components which had been freed from solids were then passed into a storage tank for high-boiling components. The gas phase which had been separated off in the first cyclone and which comprised the low-boiling components was brought into contact with a second conventional tube-bundle heat exchanger and cooled to approximately 50° C., during which process a low-boiling condensate was obtained. This was again separated off by means of a conventional cyclone.

The high-boiling components were now transferred continuously from the tank for high-boiling components into the reactor to act as contact oil, the high-boiling components being preheated to a temperature of approximately 360° C.

The plant was operated continuously for several hours in the above-described manner.

A sample of the low-boiling condensate which had been separated off and which had been generated after the plant had been operated for several hours was, after having separated off any water still present in the sample, burnt as fuel in a 1.9 l diesel motor for passenger cars. As shown in FIG. 9, the biodiesel fuel obtainable by the process according to the invention outperforms traditional fuels, which is demonstrated, inter alia, by a cylinder pressure which is increased over conventional biodiesel fuels.

LIST OF REFERENCE SYMBOLS

1 Harvesting vehicle
2 Harvesting module or harvesting attachment
3 Cutting device
4 Cabin
5 Chassis
6 Processing unit
7 Plant juice tank
8 Starting-material tank
9 Oilification module
10 Wheels
11 Fermenter
12 Housing
13 Starting-material feeder
14 Reaction chamber
15 Separating means
16 Outlet for low-boiling components
17 Outlet for high-boiling components
18 Fractionating valve
19 Nozzle
20, 21 Heating element
22 Valve for high-boiling components
23 Collecting funnel
24 First conveying means
25 Second conveying means
26 Spherical closure
27 Ball
28 Spring hanger
29 Opening of the closure
30 Further reaction chamber
31 Heated pipeline
32 Fractionating unit
33 Solids-removal unit
34 First mechanical separation device, such as metal-edge filter
35 Second mechanical separation device, such as Westfalia separator
35a Liquid outlet of the separation device
35b Oil return line
36 Tank for high-boiling components
37 Distillation zone
38 Heat-recovery means
39 Tank 40 Generator
41 Reactor
42 Stirrer
43 Starting-material inlet
44 Temperature control
45 Condenser
46 Separating means
47 Conduit
48 Starting-material valve

We claim:

1. A process for the production of hydrocarbon-containing oils, in which process a starting material containing a sugar and/or a sugar derivative is thermally cleaved, comprising:
   a reaction step in which the starting material is brought into contact with a contact oil which has an initial boiling point of at least about 200° C. at a pressure of about 1013 mbar with formation of a reaction phase at a reaction temperature in the range of from about 200 to about 600° C. and a pressure in a range of from about 0.1 to about 25 bar; and
   a processing step in which the reaction phase is separated into a low-boiling fraction and a high-boiling fraction, wherein at least a portion of the high-boiling fraction is recirculated into the reaction step as contact oil.

2. The process as claimed in claim 1, wherein the contact oil contains not more than about 10% by weight of solids particles with a particle size of less than about 50 μm.

3. The process as claimed in claim 1, wherein the contact oil is based to at least about 50% by weight on the high-boiling fraction.

4. The process as claimed in claim 1, wherein the amount of starting material in the reaction phase is in the range of from about 5 to about 80% by weight, based on the reaction phase.

5. The process as claimed in claim 1, wherein the high-boiling fraction is freed from at least one solid before being employed as contact oil.

6. The process as claimed in claim 1, wherein the contact oil contains at least about 1% by weight, based on the contact oil, of a $C_{30}$- to $C_{80}$-hydrocarbon.

7. The process as claimed in claim 1, wherein the reaction phase contains less than about 0.05% by weight, based on the starting material, of a sodium silicate molecular sieve as the catalyst.

8. The process as claimed in claim 1, wherein the reaction phase contains less than about 0.05% by weight, based on the starting material, of a solid catalyst.

9. The process as claimed in claim 1, wherein the starting material has a water content in the range of from about 0.001 to about 30% by weight, based on the starting material.

10. The process as claimed claim 1, wherein the starting material contains to at least about 5% by weight, based on the starting material, of particles with a particle size in the range of from about 0.001 to about 50 mm.

11. The process as claimed in claim 1, wherein the starting material is brought to a temperature of more than about 40° C. before being brought into contact with the contact oil.

12. The process as claimed in claim 1, wherein at least the reaction step is continuously carried out.

13. The process as claimed in claim 1, wherein the portion of the high-boiling fraction is fed continuously to the reaction step.

14. The process as claimed in claim 1, wherein the starting material contains at least one agricultural plant product.

15. The process as claimed in claim 14, wherein the agricultural product is selected from the group of straw, hay, and crops.

16. The process as claimed in claim 1, wherein the starting material is harvested less than about 10 hours before the reaction step.

17. The process as claimed in claim 1, wherein the process is carried out in a production system located in a vehicle.

18. A process for the generation of electrical, kinetic and/or potential energy, where the energy generator employed, at least in part, is an oil obtainable by a process as claimed in claim 1.

19. A process for the preparation of a chemical product, wherein an oil or gas obtainable by a process as claimed in claim 1 is subjected to a chemical reaction.

20. A chemical product containing, or at least in part being based on, an oil or gas obtainable by a process as claimed in claim 1.

21. A material containing, or at least in part being based on, chemical products as claimed in claim 20.

22. A process for transporting objects or conveying persons, wherein a transporter obtains the energy for the transport at least in part from an oil or gas obtainable by a process as claimed in claim 1.

23. The process as claimed in claim 1, where the starting material is provided by one person and apart from providing the starting material at least the reaction step is carried out by another person.

24. A system which is equipped with an oilification module, the oilification module being at least equipped with the following, material-conveying, interconnected components:
   a starting-material feeder,
   a reaction chamber which is connected to the starting-material feeder and which can optionally have a super-atmospheric or subatmospheric pressure applied to it,
   a first separator which is arranged downstream of the reaction chamber and is equipped with an outlet for low-boiling components and an outlet for high-boiling components,
   wherein a fractionating unit is arranged downstream of the outlet for low-boiling components,
   wherein a solids-removal unit is arranged downstream of the outlet for high-boiling components,
   wherein the solids-removal unit is equipped with a liquid outlet and a solids outlet,
   wherein the liquid outlet is connected to the reaction chamber via an oil return line, via a tank for high-boiling components.

25. The system as claimed in claim 24, wherein the starting-material feeder is equipped with a pressure valve.

26. The system as claimed in claim 24, wherein the starting-material feeder is equipped with a continuously operating conveyor.

27. The system as claimed in claim 26, wherein the conveyor is at least in part designed as a screw.

28. The system as claimed in any of claims 26, wherein the starting-material feeder can be heated by a feeder heating element.

29. The system as claimed in claim 24, wherein the reaction chamber is equipped with reactor heating elements.

30. The system as claimed in claim 24, wherein the reaction chamber is equipped with a mixing device.

31. The system as claimed in claim 24, wherein the solids-removal unit is equipped with at least two separation zones.

32. The system as claimed in claim 31, wherein the first separation zone is equipped with a metal-edge filter.

33. The system as claimed in claim 31, wherein the second separation zone is equipped with a separator.

34. The system as claimed in claim 24, wherein a solids-to-energy conversion unit is arranged downstream of the solids-removal unit.

35. The system as claimed in claim 24, wherein the oil return line is equipped with a return-line heating element.

36. The system as claimed in claim 24, wherein at least one further reaction chamber is arranged downstream of the outlet for high-boiling components.

37. The system as claimed in claim 24, wherein the oilification module is arranged downstream of a harvesting module.

38. The system as claimed in claim 24, which is arranged on a harvesting vehicle.

* * * * *